No. 876,363. PATENTED JAN. 14, 1908.
V. J. LAUERMAN.
APPARATUS FOR EXTRACTING OIL.
APPLICATION FILED AUG. 7, 1907.

WITNESSES:
Arthur Wesley
M. A. Schmidt

INVENTOR
V. J. Lauerman
BY
Milo B. Stevens & Co
Attorneys.

UNITED STATES PATENT OFFICE.

VANDY JOSEPH LAUERMAN, OF MINERAL WELLS, TEXAS.

APPARATUS FOR EXTRACTING OIL.

No. 876,363.  Specification of Letters Patent.  Patented Jan. 14, 1908.

Application filed August 7, 1907. Serial No. 387,445.

*To all whom it may concern:*

Be it known that I, VANDY JOSEPH LAUERMAN, a citizen of the United States, residing at Mineral Wells, in the county of Palo Pinto and State of Texas, have invented certain new and useful Improvements in Apparatus for Extracting Oil, of which the following is a specification.

This invention relates to apparatus for extracting oil from cotton-seed or other oil bearing seeds; and has for its object to provide a cooker of improved design to insure an even and uniform cooking of all the material passing therethrough.

Figure 1:
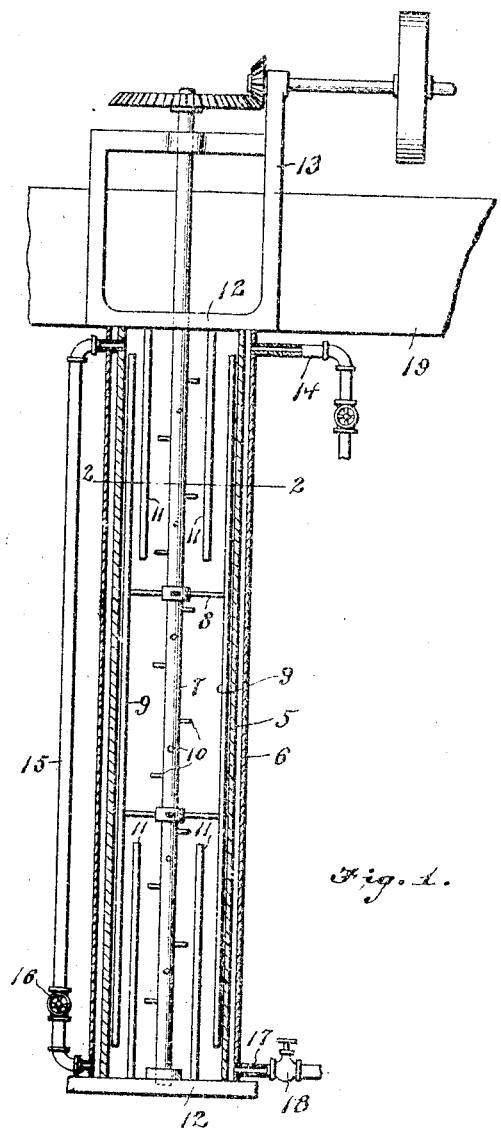
Figure 2:
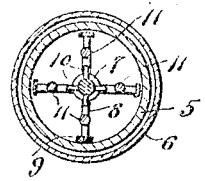

In the accompanying drawing Figure 1 is a vertical sectional view of the invention. Fig. 2 is a horizontal section on the line 2—2 of Fig. 1.

In the drawing 5 denotes a vertically arranged cylinder surrounded by a steam-jacket 6. Within the cylinder is mounted a stirrer comprising a vertical rotary shaft 7 which is driven in any suitable manner and has radially extending arms 8 to the outer ends of which are fastened blades 9 disposed parallel to the shaft and working close to the wall of the cylinder. The shaft throughout its entire length within the cylinder is armed with radially extending spikes 10 which are arranged spirally on the shaft. At the top and bottom of the cylinder are stationary blades 11. These extend into the cylinder for a considerable distance and are located between the shaft 7 and the blades 11. The blades 11 are carried by cross-bars 12 secured to the ends of the cylinder. The bottom cross-bar also has a bearing for the lower end of the shaft 7. On the top of the cylinder is a bracket 13 in which the upper end of the shaft is supported. Live steam enters the jacket 6 at the top through a pipe 14. Steam for the inside of the cylinder 5 is taken from the jacket 6 by means of a pipe 15 entering the latter at the bottom thereof and passing through the jacket and the wall of the cylinder at the top thereof. The pipe 15 has a valve 16 for controlling the steam supply to the cylinder, and on the bottom of the steam-jacket is an outlet pipe 17 provided with a valve 18 for discharging the water of condensation.

In use, the seeds are fed into the cylinder 5 at the top from a conveyer 19 of any suitable type and are discharged at the bottom. The seeds pass freely through the cylinder by their own weight and are discharged loose and thoroughly and evenly cooked.

The material in passing through the cylinder is thrown by the blades 9 back against the stationary blades 11, which in turn throw the material toward the center of the cylinder and against the spikes 10. The latter throw the material upward and back against the stationary blades thus keeping the material continually stirred while passing through the cylinder, thereby preventing the material next to the wall thereof being overcooked, and that next to the shaft being under-cooked, thus insuring an even and uniform cooking of the seeds.

By connecting the cylinder with the bottom of the steam-jacket, saturated steam is supplied to the cylinder which is advantageous as it prevents scorching or parching of the seed.

I claim:

1. An apparatus for extracting oil, comprising a cylinder, a steam-jacket therefor, separate steam-inlets to the cylinder and to the jacket at the same end thereof, an outlet at the opposite end of the jacket, and a connection between said outlet and the inlet to the cylinder, whereby the steam is delivered to one end of the jacket and taken from the opposite end thereof and delivered to the cylinder.

2. An apparatus for extracting oil, comprising a cylinder, a steam-jacket surrounding the same, a steam-inlet to the jacket at the top thereof and an outlet at the bottom, and a pipe connecting the top of the cylinder with the said outlet.

3. An apparatus for extracting oil, comprising a cylinder, a rotatable shaft therein carrying blades arranged parallel thereto, radially presented spikes on the shaft, and stationary blades between the shaft and the blades carried thereby.

In testimony whereof I affix my signature, in presence of two witnesses.

VANDY JOSEPH LAUERMAN.

Witnesses:
MINCUS M. BRIGHT,
ROBT. KAYE.